United States Patent
Adams (10) Patent No.: US 6,718,470 B1
(45) Date of Patent: *Apr. 6, 2004

(54) SYSTEM AND METHOD FOR GRANTING SECURITY PRIVILEGE IN A COMMUNICATION SYSTEM

(75) Inventor: Carlisle Adams, Ottawa (CA)

(73) Assignee: Entrust Technologies Limited, Ottawa (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,197

(22) Filed: Jun. 5, 1998

(51) Int. Cl.[7] ................................................ H04L 9/00
(52) U.S. Cl. ...................................... 713/201; 713/175
(58) Field of Search ................................. 713/201, 156, 713/166, 200, 175, 191, 182, 151; 705/54–56, 76; 380/283–285

(56) References Cited

U.S. PATENT DOCUMENTS

| | | | | |
|---|---|---|---|---|
| 5,339,403 A | * | 8/1994 | Parker ......................... | 711/221 |
| 5,560,008 A | * | 9/1996 | Johnson et al. .............. | 709/300 |
| 5,659,616 A | * | 8/1997 | Sudia .......................... | 705/76 |
| 5,717,757 A | * | 2/1998 | Micali ......................... | 713/158 |
| 5,757,920 A | * | 5/1998 | Misra et al. ................. | 713/158 |
| 5,758,069 A | * | 5/1998 | Olsen .......................... | 713/201 |
| 5,774,552 A | * | 6/1998 | Grimmer ..................... | 713/156 |
| 5,815,574 A | * | 9/1998 | Fortinsky ..................... | 713/153 |

(List continued on next page.)

FOREIGN PATENT DOCUMENTS

| | | | | |
|---|---|---|---|---|
| WO | WO 95/22810 | * | 8/1995 | ............. G07F/7/12 |
| WO | WO 00/10303 | * | 2/2000 | ............. H04L/29/06 |

OTHER PUBLICATIONS

Pretty, Lisa "Attribute Certificates", www.baltimore.com, crsc.nist.gov/pki/twg/presentations/twg–99–67.pdf.*

Press, Jim "Secure Transfer of Identity and Privilege Attributes in an Open Systems Environment" user.iclway-.co.uk/jpress/papers/pac.htm.*

Linn et al "Attribute Certificates: An Enabling Technology for Delegation and Role–Based Controls in Distributed Environments," Oct. 1999, RSA Laboratories, pp. 121–130.*

Johnston et al "Authorization and Attribute Certificates for Widely Distributed Access Control," Jun. 1998, Information and Computing Sciences Division, Lawrence Berkely National Laboratory.*

Sameshima, Yoshiki "Security Architecture based on Secret Key and Privilege Attribute Certificates," Mar. 1996, Research and Development Department, Hitachi Software Engineering Co., Ltd., pp. 357–369.*

*Primary Examiner*—Gail Hayes
*Assistant Examiner*—Christopher Revak
(74) *Attorney, Agent, or Firm*—Vedder, Price, Kaufman & Kammholz, P.C.

(57) ABSTRACT

A system and method grants security privilege in a communication system by providing privilege test criteria data for a subscriber unit so that the subscriber unit or some other entity can select among subscriber privilege data based on the privilege test criteria data, so that only the necessary privilege information is communicated between the relying party and the subscriber unit of interest. A privilege data selector selects, for example, among a plurality of attribute certificates associated with a selected subscriber unit or among sets of privilege data within an attribute certificate, the certificate (or certificates) that matches the privileged test criteria data. This pre-selected certificate is then communicated for use by the relying unit and verified that it meets the test selected by the relying party unit.

30 Claims, 7 Drawing Sheets

U.S. PATENT DOCUMENTS

| | | | | |
|---|---|---|---|---|
| 5,832,211 A | * | 11/1998 | Blakley et al. | 713/202 |
| 5,894,556 A | * | 4/1999 | Grimm et al. | 709/227 |
| 5,899,990 A | * | 5/1999 | Maritzen et al. | 707/4 |
| 5,903,882 A | * | 5/1999 | Asay et al. | 705/44 |
| 5,987,134 A | * | 11/1999 | Shin et al. | 713/159 |
| 6,006,333 A | * | 12/1999 | Nielsen | 713/202 |
| 6,044,466 A | * | 3/2000 | Anand et al. | 713/200 |
| 6,088,805 A | * | 7/2000 | Davis et al. | 713/202 |
| 6,105,027 A | * | 8/2000 | Schneider et al. | 707/9 |
| 6,108,788 A | * | 8/2000 | Moses et al. | 713/201 |
| 6,115,040 A | * | 9/2000 | Bladow et al. | 345/741 |
| 6,141,760 A | * | 10/2000 | Abadi et al. | 713/202 |
| 6,182,229 B1 | * | 1/2001 | Nielsen | 713/202 |
| 6,189,096 B1 | * | 2/2001 | Haverty | 713/155 |
| 6,275,941 B1 | * | 8/2001 | Saito et al. | 713/201 |
| 6,339,830 B1 | * | 1/2002 | See et al. | 713/202 |
| 6,484,258 B1 | * | 11/2002 | Haverty | 713/155 |
| 6,574,655 B1 | * | 6/2003 | Libert et al. | 709/200 |

* cited by examiner

SYSTEM AND METHOD FOR GRANTING SECURITY PRIVILEGE IN A COMMUNICATION SYSTEM

FIELD OF THE INVENTION

The invention relates generally to systems and methods for granting security privilege in a communication systems and more particularly to systems and methods for granting security privilege in communication systems employing cryptography based security, such as public key cryptography security systems.

BACKGROUND OF THE INVENTION

Information security is becoming increasingly important as more and more information is communicated over electronic communication links. Public key cryptography systems are well known as a mechanism for securely protecting digital information. Typically, public key certificates are used by a subscriber unit sending a message to a relying party unit, such as another subscriber or commercial institution or other entity. Generally, a subscriber unit may be for example a network computer node, a software application(s) or other entity communicating within a communication system or systems. A relying party unit may be a software application, computer node or other entity that relies on information associated with the subscriber unit.

Public key certificates, as known in the art, are data structures that serve as a vehicle by which public keys may be stored, distributed or forwarded over unsecured media without danger of undetectable manipulation. A certification authority is a trusted third party whose digital signature appears on the certificate and vouches for the authenticity of the public key bound to the subject subscriber sending the certificate.

Other data structures, such as attribute certificates, are intended to allow specification of information other than public keys so that the information may be conveyed in a trusted manner. Attributes certificates, as known in the art, may be associated with a specific public key by binding the attribute information (specific information), to the public key by the serial number of a corresponding public key certificate, or to a hash-value of the public key or certificate, or in any other suitable manner. Data appearing in the attribute certificate may include, for example, data representing limited liability resulting from a digital signature or a financial transaction, data representing a constraint of the use of a public key, such as whether the public key will be used during certain hours, or other suitable information. In some instances, attributes certificates may include data representing privileges for specific services of a relying party, such as a banking institution, software application parameters, or other suitable information. Privilege information may include, for example, the membership role of a subscriber where the subscriber is allowed specific access to certain information controlled by a relying party unit. Such privilege data may be useful, for example, in global communication networks; such as where a subscriber unit may only gain access to a specific site or section within a site reserved for employees only.

Several types of public key infrastructure systems exists. One type is sometimes referred to as an open public key infrastructure. In an open public key infrastructure system, a certificate is issued for a subscriber for a general purpose use, and not for a particular system or relying party. Typically, such systems do not include privilege data and do not authenticate a user based on privilege information, but typically only authenticate based on user identification data. Some open public infrastructure systems use access control lists that list users that are allowed to access services provided by a relying party or other subscribers. Generally, there is no implied privilege associated with a subscriber certificate until the subscriber is listed on the access control list. The certificates are such that any person or entity is entitled to receive a certificate, and the issuer of the certificate does not have any information about any subsequent relying parties to suitably restrict usage through certificate information.

A closed public key infrastructure system typically includes certification authorities that only grant certificates to subscribers within a defined group. Hence certificates are only issued to qualified subscribers, thereby eliminating the need for an access control list as used in typical open public key infrastructure systems. In closed public key infrastructure systems, the attribute certificates may be issued by a certificate issuing authority. Many attribute certificates may be issued for a given subscriber or one attribute certificate may include data representing many privileges for a given subscriber.

When a relying party unit, such as a software application, communicates with a subscriber, typical closed public key infrastructure systems require the subscriber to present all attribute certificates to the relying party. When sending the group of certificates to a relying party, some certificates may contain privilege data that is not needed by relying party and may include sending privilege information to a non-privileged party. In the case where many privileges are represented by privilege data within one certificate, sending the one certificate to a relying party may include sending privilege information to a non-privileged party. For example, a banking institution may receive an attribute certificate containing other privilege information such as a non-listed telephone number in the attribute certificate when the relying banking institution does not have privilege to obtain this information. Hence, security can be compromised.

In the instances where many attribute certificates have been issued to a subscriber unit, a relying party unit receiving multiple attributes certificates needs to process the information to determine which information within any one or more of the received attribute certificates is necessary to complete the transaction. This requires the use of unnecessary overhead in the transfer and evaluation of unnecessary information between a subscriber unit and a relying party unit. Moreover, if a subscriber wishes to operate in a different community, such as an employee of one company wishing to send information to an employee in a different company when the two companies use different attribute certificate structures, a subscribing party may have to send all attribute certificates to allow the other subscriber in the different community to obtain the necessary information to determine whether or not privilege should be granted to the subscriber.

Consequently, there exists a need for a system and method that facilitates granting of privilege in a selective manner to help reduce processing loads and to avoid communication of privileged data to non privileged parties.

DETAILED DESCRIPTION OF THE INVENTION

A system and method grants security privilege in a communication system by providing privilege test criteria data for a subscriber unit so that the subscriber unit or other entity can select necessary subscriber privilege data based on the privilege test criteria data. The necessary privilege information is communicated between the relying party and the subscriber unit of interest based on the privilege test to be carried out by or on behalf of a relying party unit. Subscriber privilege data may be any suitable data required by a relying party to facilitate, for example, acceptance, granting or access decision related to a subscriber unit or user of a subscriber unit. For example, the privilege data may be data representing a user position in a company (e.g., an employee or independent contractor), transaction signing limits or other suitable data. The relevant privilege data is selected so that privileged information is not inadvertently sent to a relying party that is not privileged to receive the information. A privilege data selector selects, for example, among a plurality of attribute certificates associated with a selected subscriber unit or among sets of privilege data within an attribute certificate that matches the privileged test criteria data. The privileged test criteria data may be generated for example by the relying party to indicate the specific privilege information necessary for the relying party to grant privilege to a subscriber unit. The selected subscriber privilege data, such as the selected attribute certificate from the group of subscriber attribute certificates, serves as pre-qualification privilege data that is used by a verifying mechanism to verify that the pre-qualification privilege data is consistent with the privilege test criteria data. This facilitates selective privilege data transfer for the subscriber unit and the relying party based on the information needed by the relying party unit.

The privilege data selector, privilege test criteria data provider and pre-qualification privilege data verifier may be embodied in any suitable unit. For example, the privilege test criteria data provider may be located in the relying party unit and the privilege data selector may located in the subscriber unit, or a third party may have a privilege data selector that facilitates the selection for a group of subscribers and sends the necessary selected pre-qualification data back to the relying party unit based on a request by a subscriber unit. In addition, if desired, privilege confirmation data may be generated indicating that the pre-qualification privilege data matches the privilege test criteria data to inform, for an example, a subscriber unit that privilege has been granted. The subscriber unit may then access the relying party or transact in accordance with the privilege data.

Figure 1:
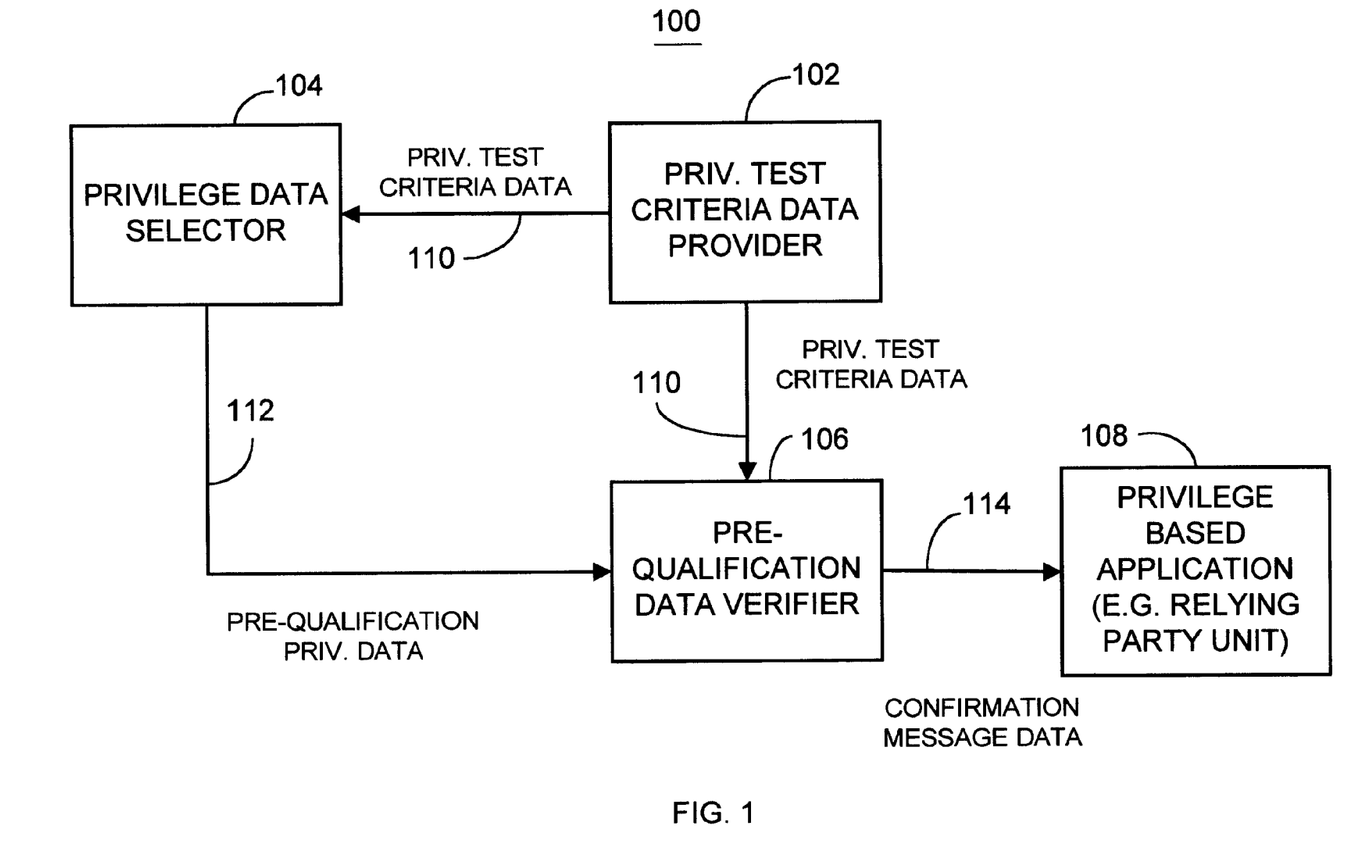
FIG. 1 is a block diagram illustrating a communication system employing cryptography based security, and having a privilege granting system in accordance with one embodiment of the invention.

FIG. 1 shows an example of a system for granting security privilege 100 that may be applied to a communication system employing cryptography based security. The system 100 includes a privilege test criteria data provider 102, a privilege data selector 104, pre-qualification privilege data verifier 106 and a privileged based application, such as a relying party software application 108. The privilege test criteria data provider 102, may be a suitably programmed computer as part of a relying party unit or any other suitable unit. The privilege test criteria data provider 102, provides privilege test criteria data 110 representing a test that will be performed by a relying party to determine whether to grant a subscriber unit privilege to carry out a transaction, communication or other operation. The system 100 may be a public key based security system, a symmetric key security system, or any other suitable information security system.

The privilege data selector 104 receives the privilege test criteria data 110 and selects among subscriber privilege data, such as a group of attribute certificates or privilege data within one attribute certificate, based on the privilege test criteria data 100 to select the appropriate privilege data that meets the test criteria data 110. The privilege data consistent with the privilege test criteria data 110 is sent as pre-qualification privilege data 112, since the privilege data selector 104 has initially selected privilege data that it believes meets the privilege test criteria data 110. The privilege data selector 104 may be a suitably programmed computing unit.

The pre-qualification privilege data verifier 106 receives the pre-qualification privilege data 112 and the privilege test criteria data 110. The pre-qualification privilege data verifier 106 verifies that the pre-qualification privilege data 112 is consistent with the received privilege test criteria data 110. Hence a second verification of the privilege test criteria data is performed by the pre-qualification privilege data verifier 106. The pre-qualification privilege data verifier 106 may, if desired, generate confirmation message data 114 representing data indicating that the pre-qualification privilege data 112 is consistent with privilege test criteria data 110. The confirmation message data 114 is received by a relying party application 108 that needs the verification of privilege data prior to granting privilege to the subscriber associated with the pre-qualification privilege data 112. The privileged based relying party application 108, may be for example a financial transaction software application that grants access to a subscriber unit to transact for example, wire transfers. It will be recognized that any suitable privilege based operation may also be used.

Figure 2:
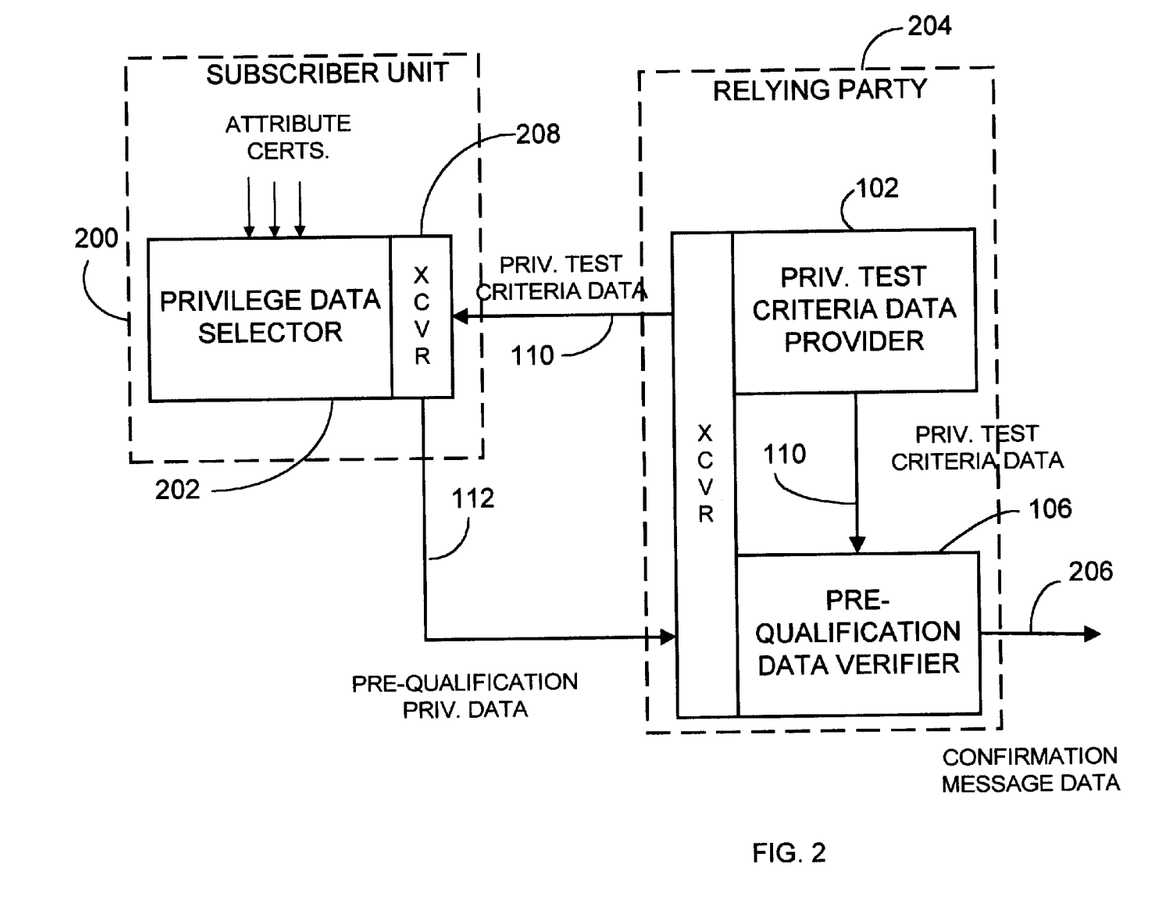
FIG. 2 is a block diagram illustrating a privilege granting system arranged in a subscriber unit and relying party unit in accordance with one embodiment of the invention.

FIG. 2 shows a specific implementation of the system of FIG. 1. A subscriber unit 200, such as a software application, network node, or other suitable mechanism for communicating with another subscriber or relying party, has a privilege data selector 104 in the form of an attribute certificate selector 202. The subscriber unit 200 is in communication with a relying party unit 204, such as a financial institution computer or software application. The relying party unit 204 includes the privilege test criteria data provider 102 and the pre-qualification privilege data verifier 106. In this embodiment, the privilege test criteria data provider 102 provides a public key certificate containing the privilege test criteria data 110. The public key certificate, may be for example, in the form of a public key certificate in accordance with International Telecommunication Union (ITU) standard ITU-T, X.509 v3. The public key certificate containing the privilege test criteria data 110 may be stored in a local storage device or a centralized repository accessible by the subscriber unit 200 in the same way that other public key certificates are available in known public key infrastructure systems. The privilege test criteria data 110 may be transmitted to the subscriber unit 200 in response to a request by the subscriber unit 200 to the relying party 204 requesting access to a particular privilege based operation or application. For example, the subscriber unit 200 may communicate a request over a global network link to a Website of the relying party requesting access to another application controlled by the relying party to facilitate a financial transfer.

The attribute certificate selector 202 retrieves subscriber certificates, such as attribute certificates, or other certificates containing data representing a subscriber unit's privilege status, for the subscriber unit 200 from the attribute certificate repository. The attribute certificate selector 202 analyzes all of the subscriber's attribute certificates to determine whether any of the attribute certificates contain privilege data that is consistent with the privilege test criteria data 110. The (one or more) matching privilege data is sent as the pre-qualification privilege data 112 which in this embodiment may be the matching attribute certificate(s). Also, the pre-qualification privilege data 112 may be a plurality of attribute certificates that contain privilege data matching the requirement of the privilege test criteria data 110.

The privilege test criteria data 110 is preferably, but not limited to be, embedded in an attribute certificate of the relying party unit 204 such as in an X.500 directory. It may also be in any other suitable location such as a location indexed in a public key certificate. For example, the attribute certificate of the relying party may contain test criteria data indicating data representing a required membership privilege to gain access to a particular software application controlled by the relying party unit. The relying party attribute certificate containing the privilege test criteria data 110 may be certified by any suitable certification authority or attribute authority, as known in the art. If desired, the privilege test criteria data 110 may be located outside of an attribute certificate in any suitable data structure.

The pre-qualification privilege data verifier 106 retrieves the relying party attribute certificate containing the privilege test criteria data 110 from the privilege test criteria data provider 102 (or directly from a storage medium containing the privilege test criteria data based on index information from the privilege test criteria data provider) and compares this information to the received pre-qualification privilege data (attribute certificate) 112 to see if they are consistent. Verification data 206 indicating a "yes/no" result to accept the subscriber's privilege may be generated when a match is confirmed.

The subscriber unit 200 includes a transceiver 208, such as a modem or other suitable transceiving mechanism that receives the privilege test criteria data 110 from the relying party unit 204. This information is then passed to the attribute certificate selector 202 to be used as the basis for comparison with privilege data stored in subscriber attribute certificates. The attribute certificate selector 202 evaluates a plurality of attribute certificates to select the certificate containing the proper attribute certificate consistent with the privilege test criteria data 110.

Figure 3:
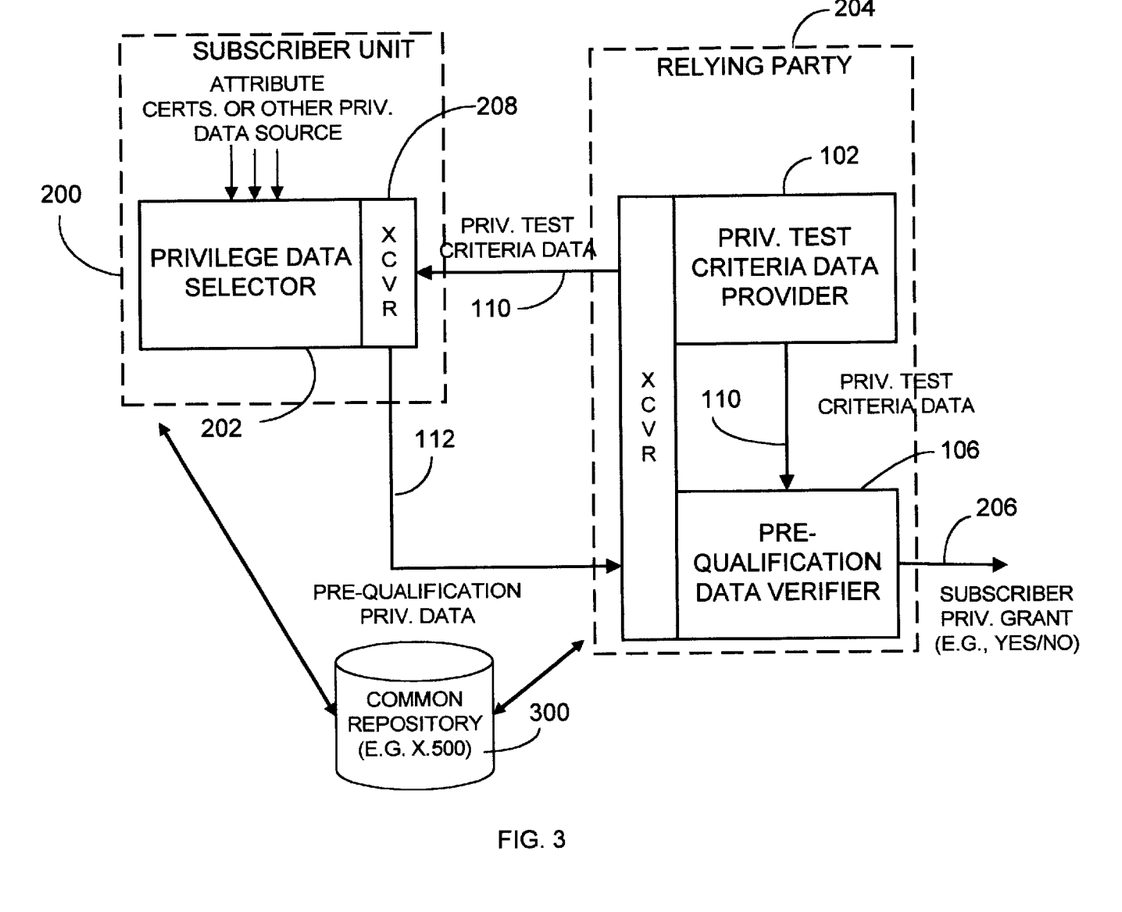
FIG. 3 is a block diagram of another embodiment of a communication system employing cryptography based security having a privilege granting system in accordance with the invention.

FIG. 3 is another embodiment of the system of FIG. 2 showing access by the relying party 204 and the subscriber unit 200 to a common directory 300, such as an X.500 type directory, as known in the art. The common directory 300 in this embodiment includes the subscriber attribute certificate information as well as the relying party attribute certificate data containing the privilege test criteria data. In this way, a common directory may store all of the subscriber unit's attribute certificates as well as the attribute certificate data of the relying party containing the privilege test criteria data.

Figure 4:
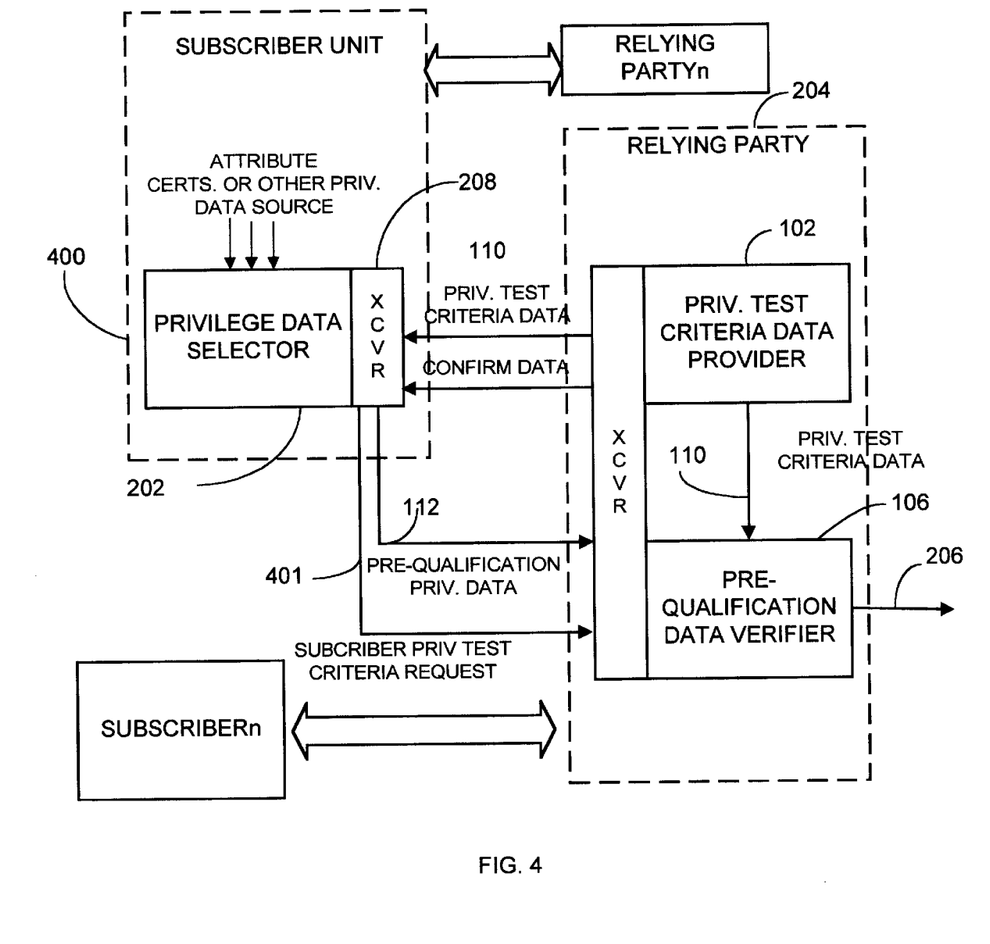
FIG. 4 is a block diagram of a communication system employing cryptography based security having a privilege granting system in accordance with one embodiment of the invention.

FIG. 4 is yet another embodiment that facilitates online communication and privilege granting between one or more subscribers and one or more relying party units. The subscriber unit 400 in addition to including the attribute certificate selector 202, also uses the attribute certificate selector 202 to send a request 401 to a specific relying party unit 204 requesting the privilege test criteria data 110. The relying party unit 204 receiving the request data 401 then sends back the test criteria data to the subscriber unit 400. It should be recognized that the subscriber unit 400 need not be authenticated by the relying party unit. As previously described with respect to FIG. 2, the subscriber unit 400 uses the attribute certificate selector 202 to generate the pre-qualification privilege data for the relying party unit of interest. As previously described, the relying party unit 204 verifies the pre-qualification privilege data using the pre-qualification privilege data verifier. Additionally, the relying party unit then generates and sends a confirmation message back to the subscriber unit 400 indicating whether the relying party has granted privilege to the subscriber unit.

Figure 5:
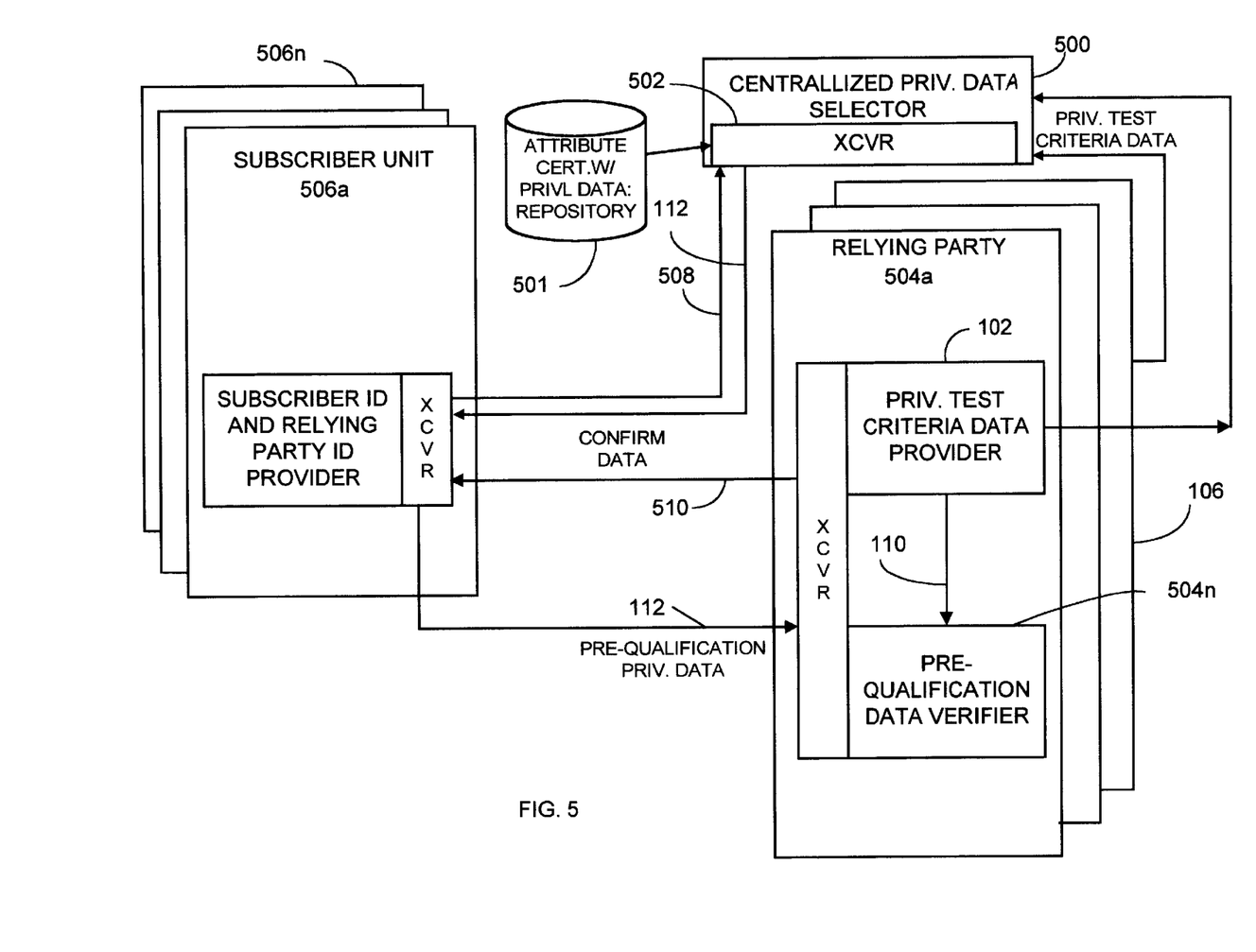
FIG. 5 is a block diagram illustrating a cryptography based security system employing a centralized privilege data selector in accordance with another embodiment of the invention.

FIG. 5 shows another alternative embodiment of a privilege granting system wherein the privilege data selector is a centralized privilege data selector 500 that selects among privilege data for a plurality of subscribers. This may be for example a third party that provides attribute certificate selection for multiple communities. The privilege data selector 500 receives the attribute certificates from an attribute certificate repository such as an X.500 directory. The privilege data selector 500 includes a transceiver 502 to facilitate communication with the plurality of relying parties 504a–504n, and a plurality of subscriber units 506a–506n. In contrast with other embodiments, the relying party unit 504a communicates the privilege test criteria data 110 to the centralized privilege data selector 500. The subscriber units 506a–506n include a subscriber identification data and relying party identification provider, such as a software program that provides a subscriber identifier and relying party identifier from a list of acceptable relying parties.

The subscriber 506 sends privilege verification request data 508 containing the subscriber identification data and selected relying party identification data to the centralized 10 privilege data selector 500. The centralized privilege data selector 500 uses the subscriber identification data to obtain the appropriate attribute certificates from the attribute certificate repository 501 and uses the relying party identification data to obtain the requisite privilege test data for the identified relying party unit. The centralized privilege data selector 500 determines whether there are any matching attribute certificates or privilege data within attribute certificates that satisfy the privilege test criteria data 110 communicated by the relying party unit 504a. Accordingly, the centralized privilege data selector selects among privilege data for the plurality of subscribers and generates pre-qualification privilege data based on the subscriber identification data. Any matching attribute certificates are sent as pre-qualification privilege data 112 back to the subscriber unit 506a. The subscriber unit 506a then transmits the pre-qualification attributes or privilege data 112 to the relying party unit through a suitable communication link. The relying party unit 504a then performs the pre-qualification privilege verification and sends a confirmation message 510 back the subscriber unit 506a. As with other embodiments, the pre-qualification privilege data verifier compares the privilege test criteria data with the pre-qualification privilege data prior to granting privilege to the subscriber unit.

Figure 6:
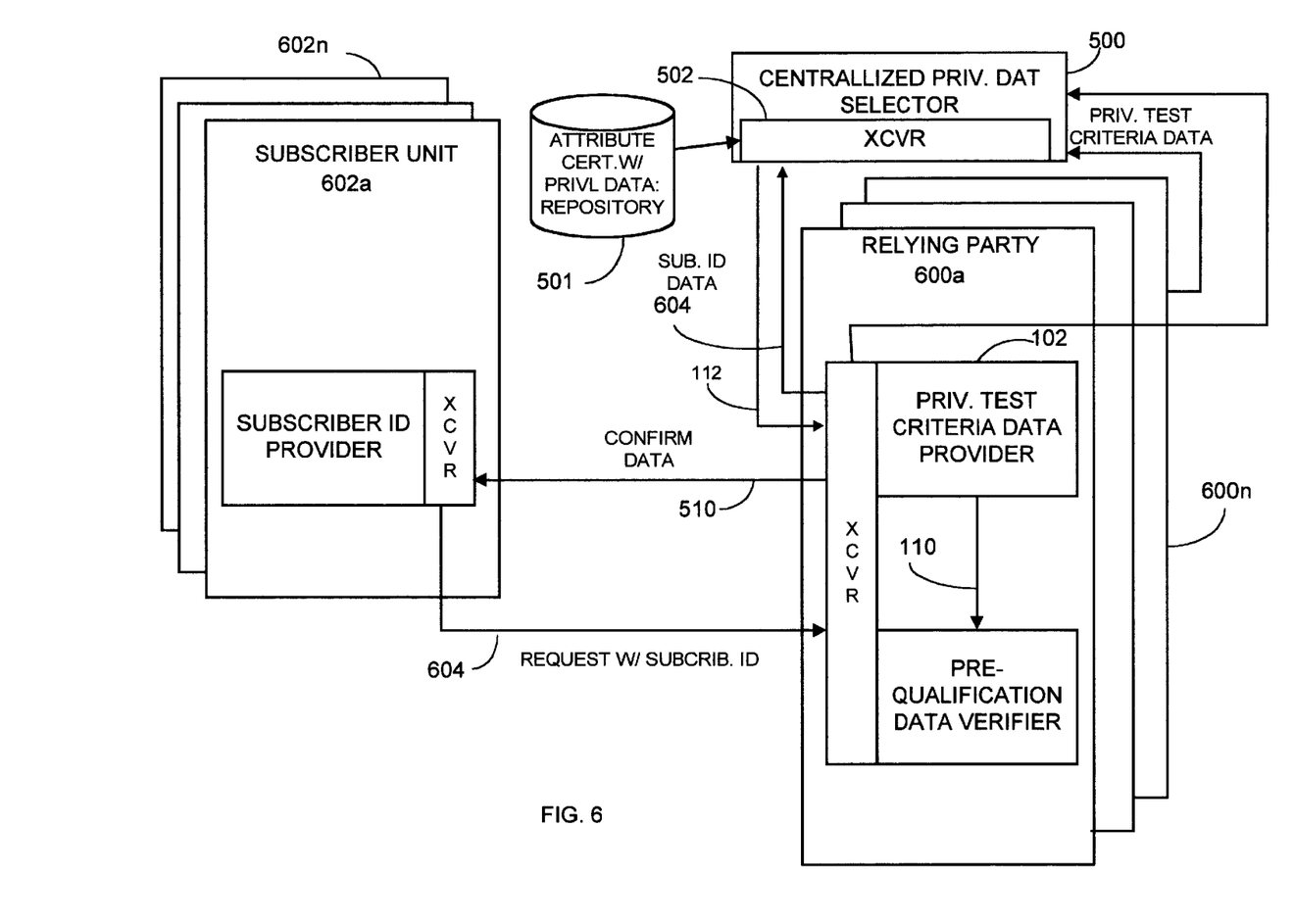
FIG. 6 is a block diagram illustrating another embodiment of a cryptography based security system employing a centralized privilege data selector in accordance with one embodiment of the invention.

FIG. 6 illustrates another embodiment of a privilege granting system similar to that shown in FIG. 5 except that subscriber identification data and request data is sent by the relying party units 600a–600n. The subscriber units 602a–602n first send request data 604 to the relying party unit 600a. In response to the request data 604, the relying party unit 600a sends the privilege test criteria data 110 along with the subscriber identification data 604 to the centralized privilege data selector 500. However in contrast with the system shown in FIG. 5, the centralized privilege data selector 500 sends the pre-qualification privilege data 112 to the relying party unit 600 instead of the subscriber unit 602a. In this way, the processing load is transferred to the relying party unit 600 instead of the subscriber unit 602a through 602n.

Figure 7:
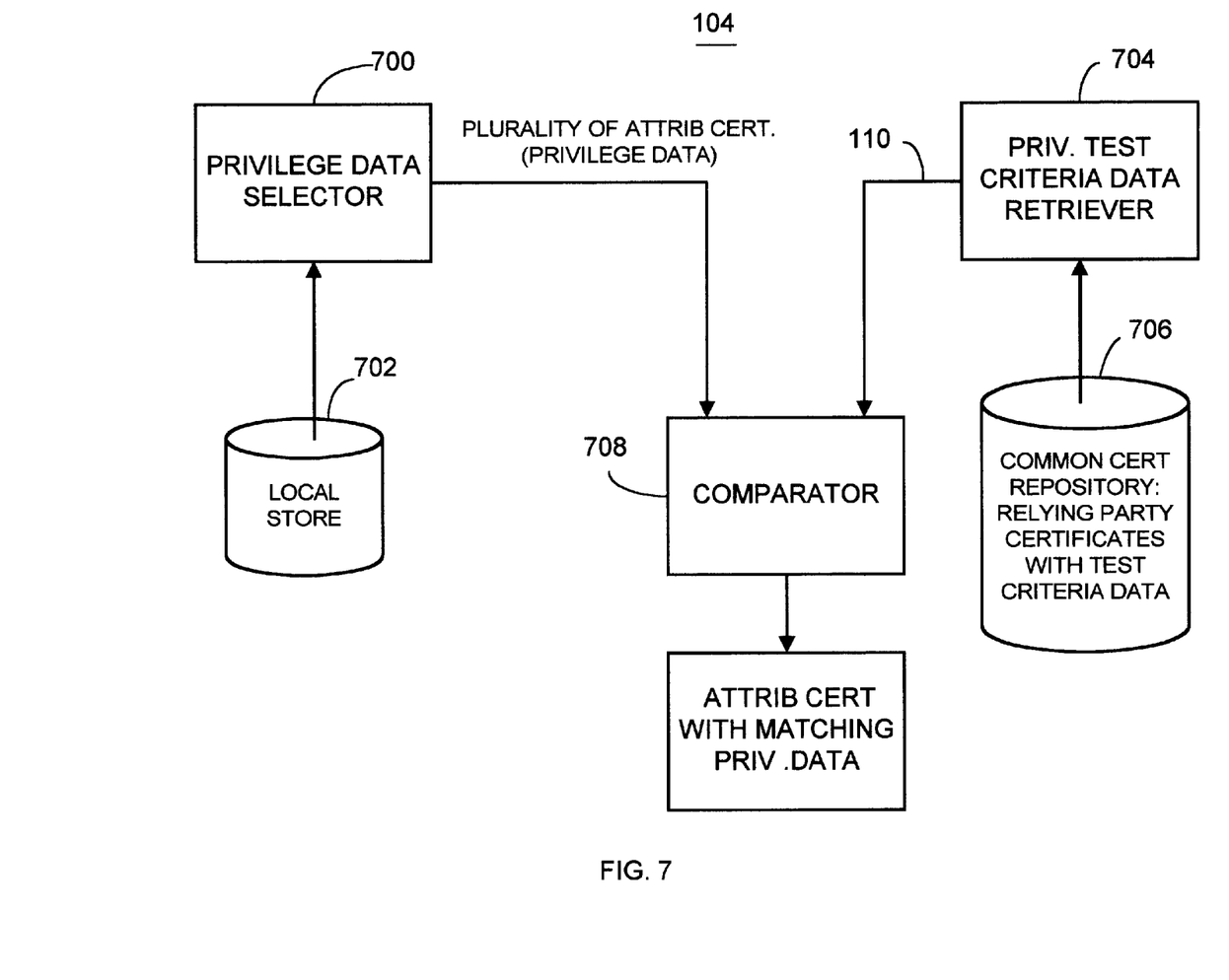
FIG. 7 is a block diagram illustrating one example of an attribute certificate selector in accordance with one embodiment of the invention.

FIG. 7 shows one example of a privilege data selector 104 configured as an attribute certificate selector. The privilege data selector 104 includes a subscriber attribute certificate retriever 700 that retrieves the stored attribute certificates containing privilege data from a local store 702. The privilege data selector 104 also includes test criteria data retriever 704 that retrieves the test criteria data 110 received by the transceiver or as received by retrieving data directly from a common directory, such as an X.500 directory that contains the relying party attribute certificates with the test criteria data embedded in the certificate. A comparator 708 compares the test criteria data to the privilege data contained in the retrieved subscriber attribute certificates and outputs any matched privilege data that matches the test criteria data. This may done for example by selecting the subscriber attribute certificate and outputting the subscriber attribute certificate as the pre-qualification privilege data if an attribute certificate contains privilege data consistent with the test criteria data embedded in the relying party attribute certificate.

It should be understood that the implementation of other variations and modifications of the invention in its various aspects will be apparent to those of ordinary skill in the art, and that the invention is not limited by the specific embodiments described. For example, any suitable data structure may be used as a certificate, such as a public key certificate, a Kerberos™ ticket, or a DCE (distributed computing environment) PAC (privilege attribute certificate) or other suitable data. Moreover, a relying party may publish, for example, in its own public key certificate, the public key certificates that it would consider for authentication purposes. For example, the relying party unit may generate privilege test criteria data representing that it will consider certificates only issued by a particular set of certification authority units, or only those certificates containing a public key for a particular algorithm type, or only those certificates containing a public key with a particular modulus size. It is therefore contemplated to cover by the present invention, any and all modifications, variations, or equivalents that fall within the spirit and scope of the basic underlying principles disclosed and claimed herein.

What is claimed is:

1. A communication system employing cryptography based security comprising:

means for providing privilege test criteria data associated with a relying unit to a subscriber;

privilege data selector means, operatively coupled to the means for providing, for selecting among subscriber privilege data that matches the privilege test criteria data to generate pre-qualification privilege data that includes the same data as the privilege test criteria data; and means, operatively coupled to the privilege data selector means and associated with the relying unit, for verifying that the pre-qualification privilege data matches the privilege test criteria data to facilitate selective privilege data transfer for at least one subscriber.

2. The communication system of claim 1 comprising means, operatively coupled to the verifying means, for providing privilege confirmation data representing data indicating that the pre-qualification privilege data matches the privilege test criteria data associated with the relying unit.

3. The communication system of claim 1 wherein the means for providing privilege test criteria data provides a certificate containing the privilege test criteria data.

4. The communication system of claim 1 wherein the privilege data selector means retrieves subscriber certificates containing subscriber privilege data and compares the subscriber privilege data with the privilege test criteria data to determine whether the subscriber privilege data in a selected subscriber certificate matches the privilege test criteria data.

5. The communication system of claim 1 wherein the means for providing privilege test criteria data is a relying unit.

6. The communication system of claim 1 wherein the means for providing privilege test criteria data includes a data storage unit containing certificates containing privilege test criteria data.

7. The communication system of claim 1 including a subscriber unit and wherein the privilege data selector means is a centralized means for selecting among privilege data for a plurality of subscribers and wherein the subscriber unit includes means for providing subscriber identification data and relying party unit identification data to the privilege data selector means and wherein the privilege data selector means includes means for sending the pre-qualification privilege data to the subscriber based on the subscriber identification data and relying party unit identification data and further wherein the subscriber unit includes means for sending the pre-qualification privilege data to the relying party unit.

8. The communication system of claim 1 wherein the means for verifying includes means for comparing the privilege test criteria data with the pre-qualification privilege data prior to granting privilege to the subscriber unit.

9. The communication system of claim 1 wherein the privilege data selector means is a centralized means for selecting among privilege data for a plurality of subscriber units and wherein the system further includes a subscriber unit having means for providing privilege request data and subscriber identification data, and wherein the centralized means for selecting among privilege data for a plurality of subscribers generates the pre-qualification privilege data based on the subscriber identification data and includes means for sending the pre-qualification privilege data to the relying party unit based on the subscriber identification data.

10. The communication system of claim 1 further including:

means, operatively coupled to the means for providing privilege test criteria data, for requesting the privilege test criteria data; and means, operatively coupled to the means for verifying, for providing confirmation data representing whether the means for verifying accepts the pre-qualification privilege data to grant privilege to a subscriber unit.

11. A communication system employing cryptography based security comprising:

at least one relying unit having means for providing privilege test criteria data associated with the relying unit as part of relying party certificate data;

at least one subscriber unit, operatively coupled to the at least one relying unit, having privilege data selector means for selecting among subscriber certificate data containing privilege data, that matches the privilege test criteria data, to generate pre-qualification privilege data such that the pre-qualification privilege data is a subscriber certificate; and the relying unit further including means for verifying that the pre-qualification privilege data matches the privilege test criteria data to facilitate selective privilege data transfer for the at least one subscriber.

12. The communication system of claim 11 comprising means, operatively coupled to the verifying means, for providing privilege confirmation data representing data indicating that the pre-qualification privilege data matches the privilege test criteria data associated with the relying unit.

13. A subscriber in a communication system employing cryptography based security comprising:

means for receiving privilege test criteria data; and privilege data selector means, operatively coupled to the receiving means, for selecting among subscriber certificate data containing privilege data, that matches received privilege test criteria data, to generate pre-qualification privilege data and wherein the pre-qualification privilege data is a subscriber certificate.

14. A relying party unit in a communication system employing cryptography based security comprising:

means for providing privilege test criteria data for at least one subscriber unit;

means for receiving pre-qualification privilege data associated with at least one subscriber unit; and means, operatively coupled to the means for providing privilege data and to the receiving means, for verifying that the pre-qualification privilege data matches the privilege test criteria data to facilitate selective privilege data for at least one subscriber.

15. The communication system of claim 14 wherein the means for providing privilege test criteria data provides at least one certificate containing the privilege test criteria data.

16. The communication system of claim 14 wherein the pre-qualification privilege data is included as part of a subscriber certificate containing subscriber privilege data.

17. A method of granting privilege in communication system employing cryptography based security comprising:

providing privilege test criteria data associated with a relying unit to a subscriber;

selecting among subscriber privilege data that matches the privilege test criteria data to generate pre-qualification privilege data that includes the same data as the privilege test criteria data; and verifying, by the relying unit that the pre-qualification privilege data matches the privilege test criteria data to facilitate selective privilege data transfer for at least one subscriber.

18. The method of claim 17 comprising: providing privilege confirmation data representing data indicating that the pre-qualification privilege data matches the privilege test criteria data associated with the relying unit.

19. The method of claim 17 wherein the step of providing privilege test criteria data includes providing a certificate containing the privilege test criteria data.

20. The method of claim 17 wherein selecting among subscriber privilege data includes retrieving subscriber certificates containing subscriber privilege data and comparing the subscriber privilege data with the privilege test criteria data to determine whether the subscriber privilege data on a selected subscriber certificate matches the privilege test criteria data.

21. The method of claim 17 wherein selecting among subscriber privilege data includes selecting among subscriber privilege data from a centralized storage medium containing subscriber privilege data for a plurality of subscribers and including providing subscriber identification data and relying party unit identification data to a privilege data selector and sending the pre-qualification privilege data to a subscriber based on the subscriber identification data and relying party unit identification data and further including sending the pre-qualification privilege data to a relying party unit.

22. The method of claim 17 wherein the step of verifying includes comparing the privilege test criteria data with the pre-qualification privilege data prior to granting privilege to the subscriber unit.

23. The method of claim 17 wherein selecting among subscriber privilege data includes selecting among privilege data for a plurality of subscriber units from a centralized storage medium and further including providing privilege verification request data and subscriber identification data, and generating the pre-qualification privilege data based on the subscriber identification data.

24. The method of claim 17 further including:

requesting the privilege test criteria data; and providing confirmation data representing whether the pre-qualification privilege data was accepted to grant privilege to a subscriber unit.

25. A method for granting privilege in a communication system employing cryptography based security comprising:

providing privilege test criteria data associated with the relying unit as part of relying party certificate data;

selecting among subscriber certificate data containing privilege data, that matches the privilege test criteria data, to generate pre-qualification privilege data such that the pre-qualification privilege data is a subscriber certificate; and verifying that the pre-qualification privilege data matches the privilege test criteria data to facilitate selective privilege data transfer for at least one subscriber.

26. The method of claim 25 including providing privilege confirmation data representing data indicating that the pre-qualification privilege data matches the privilege test criteria data associated with a relying unit.

27. A method for granting privilege in a communication system employing cryptography based security comprising:

receiving privilege test criteria data; and selecting among subscriber certificate data containing privilege data, that matches received privilege test criteria data, to generate pre-qualification privilege data and wherein the pre-qualification privilege data is a subscriber certificate.

28. A method for granting privilege in a communication system employing cryptography based security comprising:

providing privilege test criteria data for at least one subscriber unit to a subscriber;

receiving pre-qualification privilege data associated with at least one subscriber unit wherein the pre-qualification privilege data includes the same data as the privilege test criteria data; and verifying, by the relying unit that the pre-qualification privilege data matches the privilege test criteria data to facilitate selective privilege data transfer for at least one subscriber.

29. The method of claim 28 wherein providing privilege test criteria data includes providing at least one certificate containing the privilege test criteria data.

30. The method of claim 28 wherein the pre-qualification privilege data is included as part of a subscriber certificate containing subscriber privilege data.

* * * * *